(12) United States Patent
Anikitchev

(10) Patent No.: US 6,256,332 B1
(45) Date of Patent: Jul. 3, 2001

(54) STRIPLINE LASER

(75) Inventor: Sergey Anikitchev, Richmond Hill (CA)

(73) Assignee: Rofin-Sinar Laser GmbH, Hamburg (DE)

( * ) Notice: Subject to any disclaimer, the term of this patent is extended or adjusted under 35 U.S.C. 154(b) by 0 days.

(21) Appl. No.: 09/152,409

(22) Filed: Sep. 14, 1998

Related U.S. Application Data

(63) Continuation of application No. PCT/EP97/00568, filed on Feb. 8, 1997.

(30) Foreign Application Priority Data

Mar. 13, 1996 (DE) .............................. 196 09 851

(51) Int. Cl.[7] ................................................ H10S 3/081
(52) U.S. Cl. ................................................ 372/93
(58) Field of Search ................... 372/93, 92, 94, 372/87

(56) References Cited

U.S. PATENT DOCUMENTS

| | | | |
|---|---|---|---|
| 4,719,639 | * 1/1988 | Tulip | 372/66 |
| 4,939,738 | * 7/1990 | Opower | 372/95 |
| 5,048,048 | * 9/1991 | Nishimae et al. | 372/95 |
| 5,123,028 | * 6/1992 | Hobart et al. | 372/95 |
| 5,140,606 | * 8/1992 | Yarborough et al. | 372/64 |
| 5,231,644 | * 7/1993 | Krueger et al. | 372/107 |
| 5,353,297 | * 10/1994 | Koop et al. | 372/64 |
| 5,651,020 | * 7/1997 | Nighan, Jr. et al. | 372/92 |
| 5,661,746 | * 8/1997 | Sukhman et al. | 372/83 |
| 5,748,663 | * 5/1998 | Chenausky | 372/64 |
| 5,754,575 | * 5/1998 | Sukhman et al. | 372/36 |
| 5,894,493 | * 4/1999 | Sukhman et al. | 372/83 |
| 5,912,915 | * 6/1999 | Reed et al. | 372/93 |
| 5,926,494 | * 7/1999 | Pepper | 372/70 |
| 5,982,803 | * 11/1999 | Sukhman et al. | 372/87 |

* cited by examiner

Primary Examiner—Robert H. Kim
Assistant Examiner—Delma R. Flores Ruiz
(74) Attorney, Agent, or Firm—Herbert L. Lerner; Laurence A. Greenberg; Werner H. Stemer

(57) ABSTRACT

A stripline laser includes a discharge chamber between two flat electrodes. A flat multipass resonator which is stable in relation to the width of the discharge chamber has a folding mirror configuration inside the resonator and is associated with end surfaces directed perpendicularly to the longitudinal direction of the discharge chamber.

4 Claims, 2 Drawing Sheets

STRIPLINE LASER

CROSS-REFERENCE TO RELATED APPLICATION

This application is a continuation of copending International Application No. PCT/EP97/00568, filed Feb. 8, 1997, which designated the United States.

BACKGROUND OF THE INVENTION

Field of the Invention:

The invention relates to a stripline laser.

Stripline or slab lasers are disclosed, for example, in U.S. Pat. No. 4,719,639 and U.S. Pat. No. 5,048,048. In the case of those lasers, an elongate narrow parallelepipedal discharge chamber for a gas, in particular $CO_2$, is formed between planar electrodes which are parallel to one another. The gas is electrically excited by a radiofrequency voltage applied to the electrodes. In order to achieve a laser effect, resonator mirrors are disposed opposite rectangular end surfaces of the discharge chamber. Those resonator mirrors form a resonator only in a plane which is parallel to the electrodes, that is to say in the direction of the width of the discharge chamber. Transversely thereto, that is to say in the direction of the distance between the electrodes or the height of the discharge chamber, the two electrodes behave as waveguides.

U.S. Pat. No. 4,719,639 explains in further detail that both stable and unstable resonators are suitable. In particular, an unstable confocal resonator of the negative branch is proposed in U.S. Pat. No. 5,048,048.

Unstable resonators have a number of advantages which are important for high-power lasers, in particular. Thus, with unstable resonators it is possible, for example, to achieve high mode volumes and better utilization of the total volume region of the discharge chamber, that is to say of the entire excited gas, even in relatively short resonators. Compact high-power lasers can thus be built with the aid of unstable resonators.

However, unstable resonators have the property that the intensity distribution in the cross-section of the laser beam differs in the near-field and far-field range and that the far-field distribution moreover has, as a rule, secondary maxima which have to be filtered out by suitable devices.

SUMMARY OF THE INVENTION

It is accordingly an object of the invention to provide a stripline laser, which overcomes the hereinafore-mentioned disadvantages of the heretofore-known devices of this general type and which is distinguished by a high beam quality and a high laser power in conjunction with a compact overall structure of the laser.

With the foregoing and other objects in view there is provided, in accordance with the invention, a stripline laser, comprising two planar electrodes; a discharge chamber or space disposed between the two planar electrodes and having a longitudinal direction, a width and end surfaces oriented perpendicularly to the longitudinal direction; and a planar multipass resonator being associated with the end surfaces and being stable referring or relative to the width of the discharge chamber, the resonator having a folding mirror configuration within the resonator.

The use of a stable multipass resonator configuration having a resonator-internal folding mirror configuration ensures that, on one hand, the entire discharge chamber is utilized and that, on the other hand, the advantageous properties of the laser beam that are associated with the use of a stable resonator, are obtained. Those advantageous properties are, in particular, an intensity distribution over the beam cross-section that is virtually independent of the distance from the beam exit window, as well as the absence of interfering secondary maxima.

In accordance with another feature of the invention, the folding mirror configuration is a telescopic folding mirror configuration.

In accordance with a further feature of the invention, the telescopic folding mirror configuration has an optical axis running outside the discharge chamber.

In accordance with a concomitant feature of the invention, the telescopic folding mirror configuration includes a mirror associated with one of the end surfaces and having a reflecting surface curved convexly toward the discharge chamber; and a mirror facing the other of the end surfaces and having a reflecting surface curved concavely toward the discharge chamber.

Other features which are considered as characteristic for the invention are set forth in the appended claims.

Although the invention is illustrated and described herein as embodied in a stripline laser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
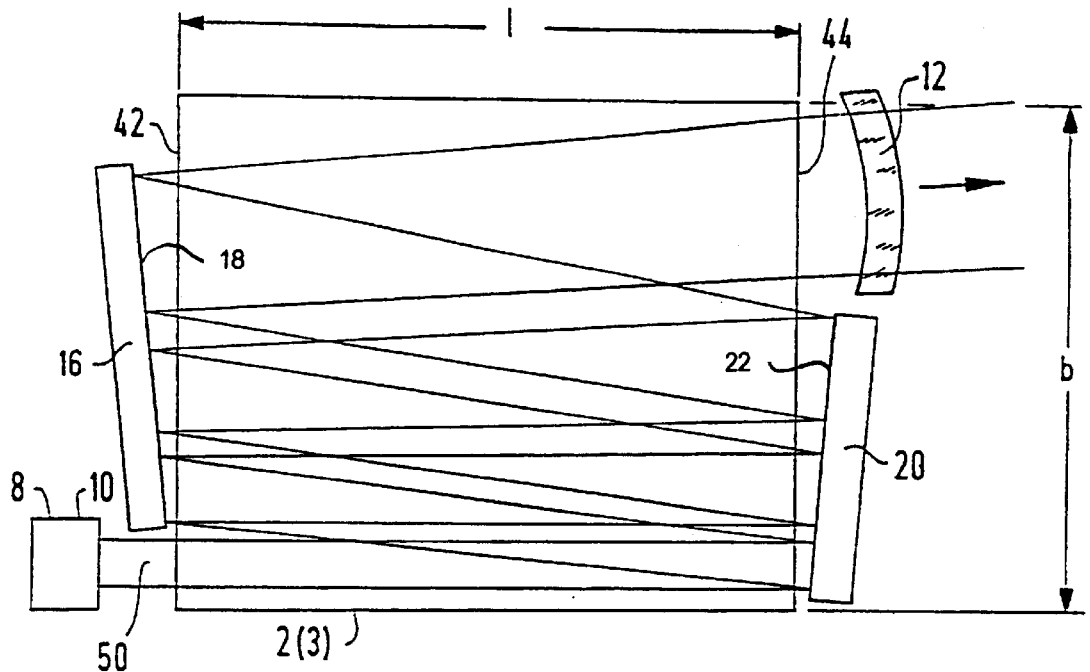
FIG. 1 and FIG. 2 are respective plan and side-elevational views diagrammatically illustrating a stripline laser according to the invention.
Figure 2:
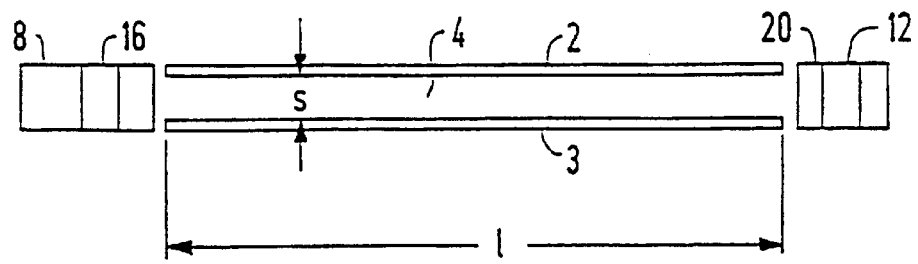

Referring now to the figures of the drawings in detail and first, particularly, to FIGS. 1 and 2 thereof, there is seen a stripline laser that contains two planar electrodes 2 and 3 in plate form which are disposed parallel to one another and separated by a gap s. A laser gas, in particular a $CO_2$-containing gas mixture which is situated between these two electrodes 2 and 3, is excited (pumped) by a radiofrequency voltage applied to the electrodes 2 and 3. The electrodes 2 and 3 define a parallelepipedal discharge chamber 4 having a length 1, for example 500 cm to 1000 cm, a width and a height s corresponding to the distance between the electrodes. The distance s is in the region of a few millimeters and is distinctly less than a width b, which may be several centimeters, for example 20 cm.

The discharge chamber 4 has end surfaces 42 and 44 which are oriented perpendicularly to its longitudinal direction and have a rectangular cross-section with the width b and the height s. Mirrors 8, 16 and 12, 20 which are respectively disposed opposite these end surfaces 42 and 44 form a stable planar multipass resonator parallel to planes spanned by the electrodes 2 and 3. In the exemplary embodiment, the multipass resonator includes an end mirror 8 and an end mirror 12 as well as a folding mirror configuration disposed within the resonator. In the exemplary embodiment, the folding mirror configuration includes two folding mirrors 16 and 20, which are inclined with respect to the end surfaces 42 and 44 and have respective planar reflecting surfaces 18 and 22. Each end surface 42 and 44 is associated with a respective folding mirror 16 and 20. The end mirror 8 has a high degree of reflection (near 100%), serves as a back mirror and is likewise a planar mirror having a planar reflecting surface 10. The end mirror 12 is coated in such a way that it is semi-transparent, serves as an output-coupling mirror, is a cylindrical mirror which is curved concavely in the direction of the discharge chamber 4 and is spherical or disposed with its cylinder axis perpendicular to the electrodes 2 and 3. Its degree of reflection R is chosen in such a way that a maximum efficiency is achieved, which is between 60% and 80%, for example. Instead of a planar end mirror 8 for back-mirroring and a concave end mirror 12 for output coupling, it is also possible to use a concavely curved back mirror and a planar output-coupling mirror or two concave end mirrors.

The mirror curvatures of the end mirrors 8 and 10 are chosen in this case in such a way that a stable resonator is produced.

Propagation conditions parallel to the width b of the end surfaces 42 and 44 are determined by the physical laws underlying free beam propagation. A stable multipass resonator is present only in the plane spanned by this direction and the plane spanned by the longitudinal direction 1 of the electrodes 2 and 3. Perpendicularly to the electrodes 2 and 3, the beam propagation within the stripline laser is essentially determined by the waveguide properties of the narrow discharge chamber 4 formed by the electrodes 2 and 3.

The folding mirrors 16 and 20 lying opposite one another compel a beam 50 which is propagating within the resonator to effect a plurality of resonator-internal passes that in each case are laterally offset with respect to one another. Consequently, the effect of this folding mirror configuration is, on one hand, that the total volume of the discharge chamber is utilized for the optical amplification. On the other hand, the folding mirror configuration also effects an increase in the effective length of the resonator, which has an advantageous effect on the frequency purity and the frequency stability of the output beam. Instead of the simple embodiment having two folding mirrors 16 and 20 which is illustrated in the figure, embodiments containing more than two folding mirrors are also conceivable.

Figure 3:
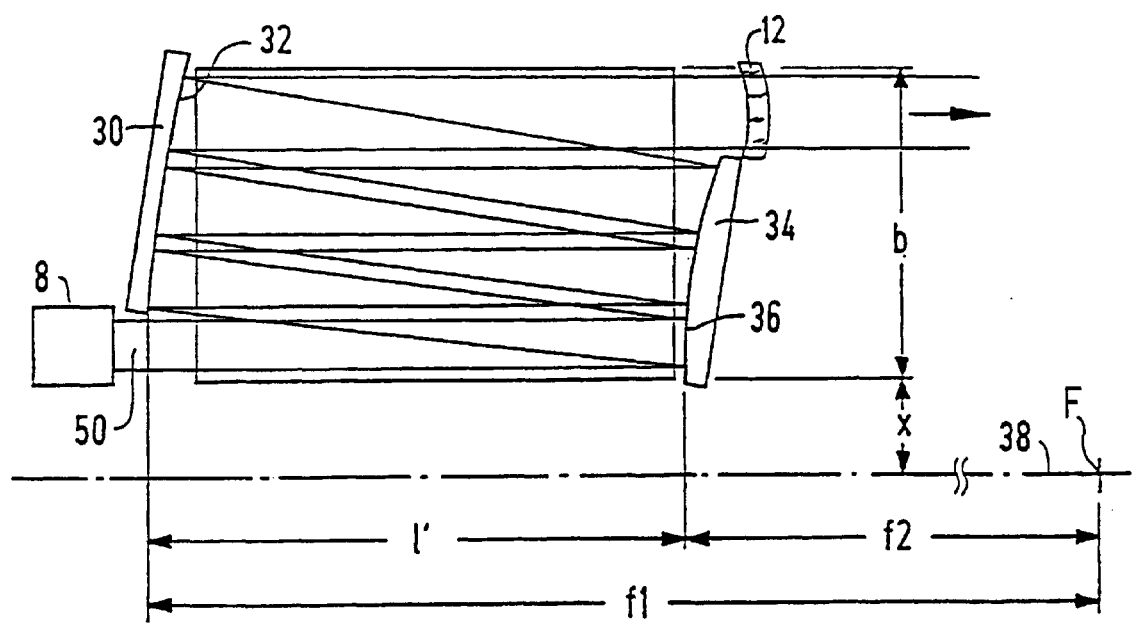
FIG. 3 is a plan view of a particularly advantageous refinement of a stripline laser according to the invention.

In accordance with FIG. 3, a telescopic folding mirror configuration is provided which includes a folding mirror 30 having a reflecting surface 32 that is curved concavely toward the discharge chamber 4, and a folding mirror 34 having a reflecting surface 36 that is curved convexly toward the discharge chamber 4. The two folding mirrors 30 and 34 form an astigmatic telescopic imaging system with an optical axis 38 that is disposed outside the discharge chamber parallel to the longitudinal direction of the electrodes. The advantage of such telescopic folding is that a small beam cross-section is expanded in accordance with a low Fresnel number with a small number of passes and correspondingly low losses, and consequently a relatively large beam cross-section is available, which is associated with low loading on the transmission optics.

The telescopic folding mirror configuration 30, 34 corresponds to an unstable confocal off-axis resonator of the positive branch. The entire mirror configuration forms a stable resonator with a resonator-internal telescope. A typical exemplary embodiment has a width $a_1 \approx 1.7$ cm for the end mirror 8 and a width $a_2 \approx 4.4$ cm for the end mirror 12, a distance $l' \approx 100$ cm between the mirrors 30 and 34 on the optical axis 38, a distance $x = 10$ cm from the optical axis 38, a width $b = 20$ cm of the discharge chamber 4, a focal length of the folding mirror 30 of $f_1 \approx 688$ cm and a focal point of the folding mirror 34 of $f_2 \approx 588$ cm (confocal configuration, focal point F outside the resonator to the side of the folding mirror 34). The result is 6 cyclic passes of the beam 50 and a Fresnel number $N_f = 1.2$ in the direction of the width b, that is to say a "single-mode-operation" in the direction of this width b and in a direction perpendicular to the electrode surfaces, as well as an axial mode separation of about 25 MHz. Such a stripline laser generates a stable-frequency laser beam having a Gaussian-like intensity distribution in both directions.

I claim:

1. A stripline laser, comprising:

two planar electrodes;

a discharge chamber disposed between said two planar electrodes and having a longitudinal direction, a width and end surfaces oriented perpendicularly to said longitudinal direction; and a planar multipass resonator associated with said end surfaces, extended parallel to said width of said discharge chamber and being stable relative to said width of said discharge chamber, said resonator having a folding mirror configuration within said resonator.

2. The stripline laser according to claim 1, wherein said folding mirror configuration is a telescopic folding mirror configuration.

3. The stripline laser according to claim 2, wherein said telescopic folding mirror configuration has an optical axis running outside said discharge chamber.

4. The stripline laser according to claim 3, wherein said telescopic folding mirror configuration includes:

a mirror associated with one of said end surfaces and having a reflecting surface curved convexly toward said discharge chamber; and a mirror facing the other of said end surfaces and having a reflecting surface curved concavely toward said discharge chamber.

* * * * *